United States Patent
Nguyen

(10) Patent No.: US 11,091,963 B2
(45) Date of Patent: Aug. 17, 2021

(54) SLIP LOCK CONNECTOR SYSTEM

(71) Applicant: Cameron International Corporation, Houston, TX (US)

(72) Inventor: Dennis P. Nguyen, Pearland, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 942 days.

(21) Appl. No.: 15/699,561

(22) Filed: Sep. 8, 2017

(65) Prior Publication Data
US 2019/0078397 A1 Mar. 14, 2019

(51) Int. Cl.
| | | |
|---|---|---|
| *E21B 17/02* | (2006.01) | |
| *F16L 37/26* | (2006.01) | |
| *F16L 25/06* | (2006.01) | |
| *F16L 21/08* | (2006.01) | |

(52) U.S. Cl.
CPC .............. *E21B 17/02* (2013.01); *F16L 21/08* (2013.01); *F16L 25/065* (2013.01); *F16L 37/26* (2013.01)

(58) Field of Classification Search
CPC .... E21B 17/02; E21B 33/038; E21B 43/0107; F16L 25/065; F16L 21/08; F16L 37/26
See application file for complete search history.

(56) References Cited

U.S. PATENT DOCUMENTS

| | | | | |
|---|---|---|---|---|
| 3,134,615 A | * | 5/1964 | Cator | F16L 19/08 285/341 |
| 3,158,388 A | * | 11/1964 | Marshall | F16L 33/222 285/90 |
| 3,941,410 A | * | 3/1976 | Miyaoka | F16L 21/04 285/321 |
| 5,431,453 A | * | 7/1995 | Yamashita | F16L 21/08 285/123.4 |
| 5,727,631 A | * | 3/1998 | Baker | E21B 19/22 166/379 |
| 2005/0242519 A1 | * | 11/2005 | Koleilat | E21B 33/04 277/434 |
| 2011/0284206 A1 | * | 11/2011 | Nguyen | E21B 33/06 166/75.11 |
| 2015/0068725 A1 | * | 3/2015 | Duong | E21B 33/04 166/75.14 |

* cited by examiner

*Primary Examiner* — James M Hewitt, II

(57) ABSTRACT

A slip lock connector system with a slip lock connector that couples a first annular body to a second annular body. The slip lock connector includes a first tapered surface and a second tapered surface. The first tapered surface and the second tapered surface slide over each other to drive the first and second tapered surfaces in radially opposite directions. The movement of the first and second tapered surfaces in radially opposite directions couples the slip lock connector to the second annular body.

16 Claims, 5 Drawing Sheets

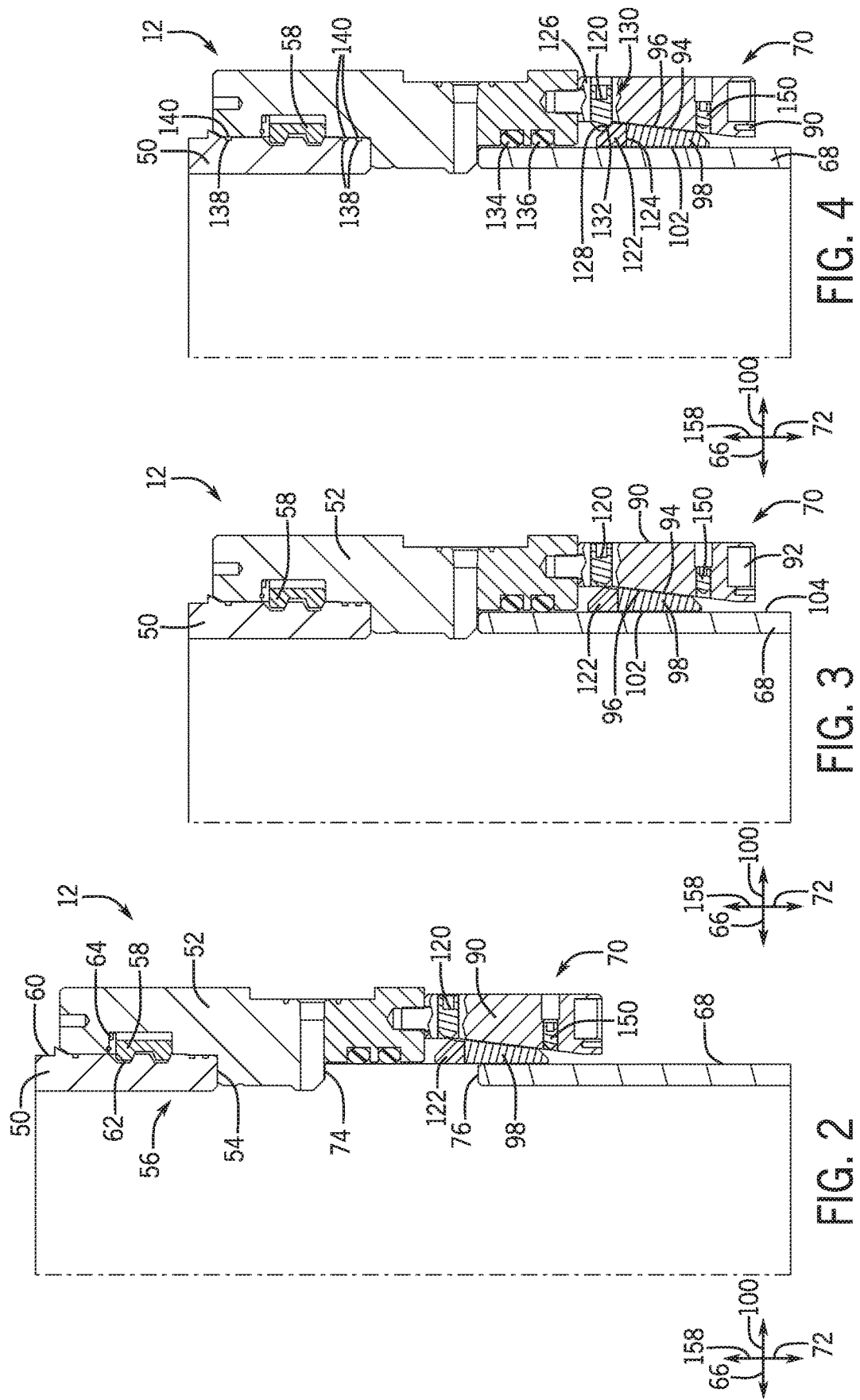

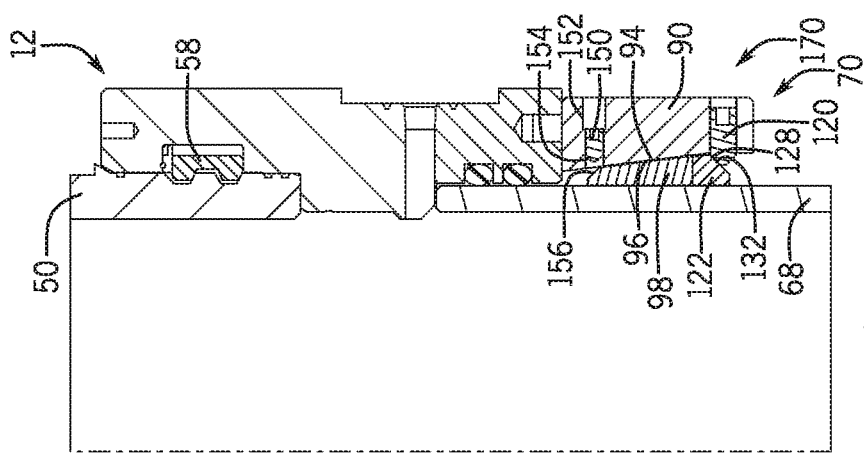
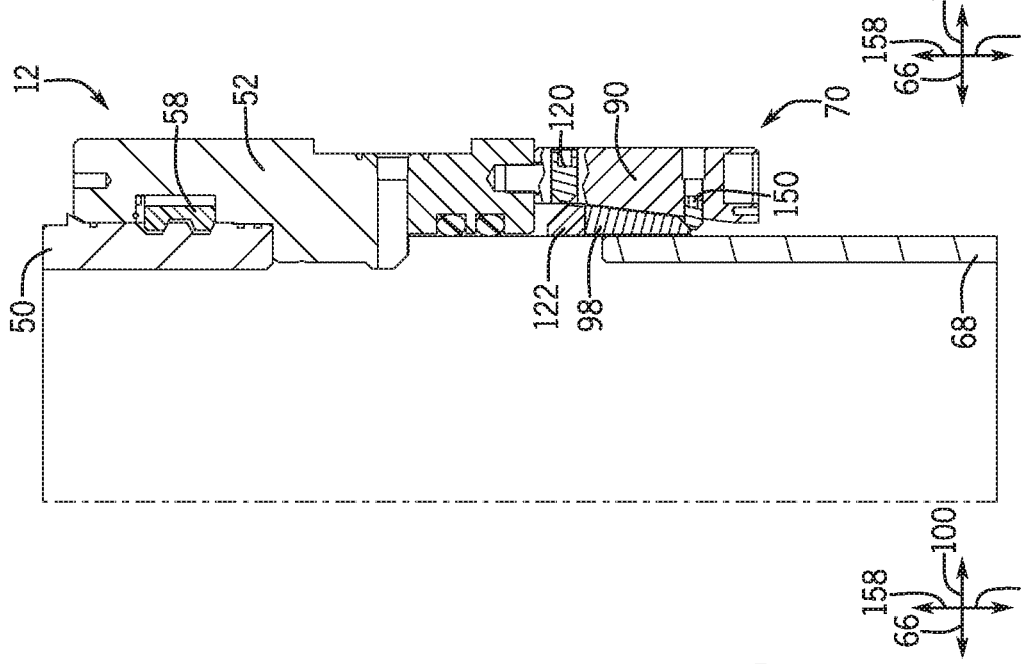
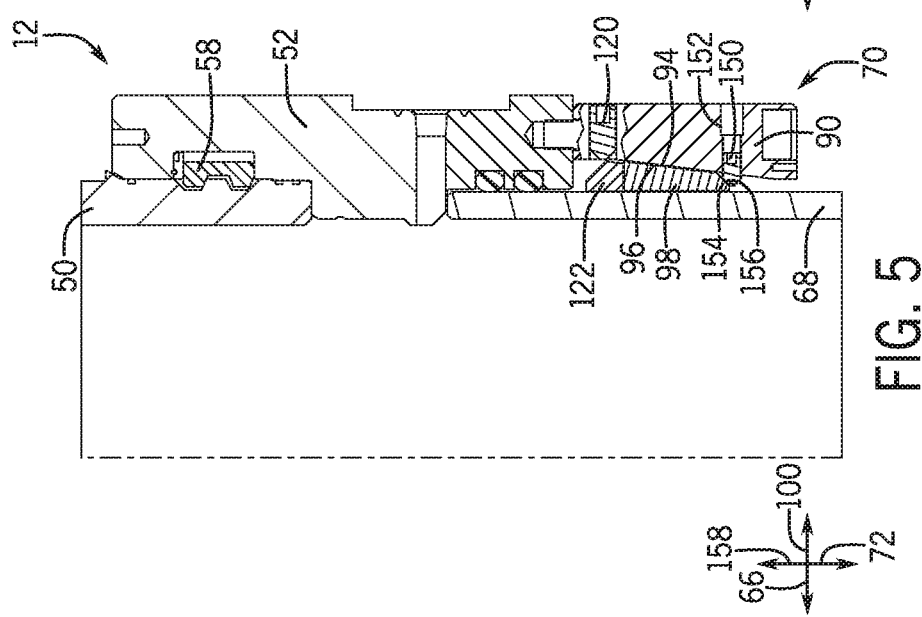

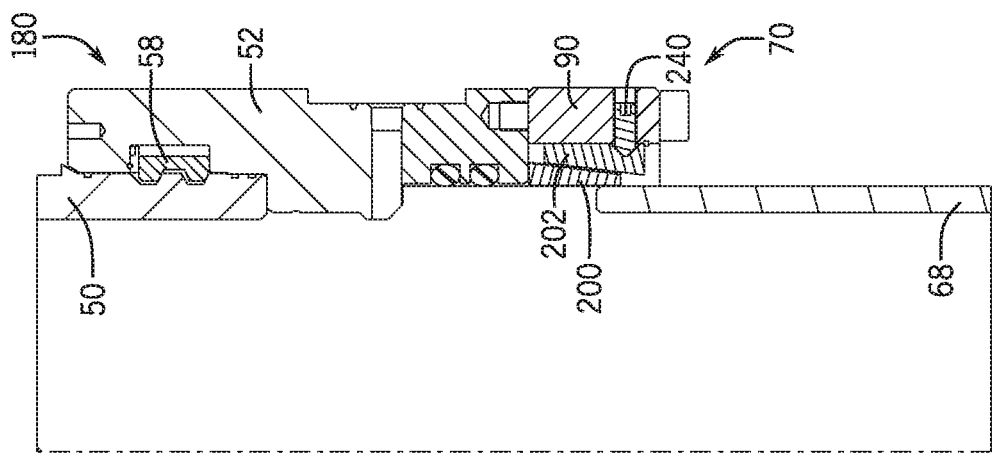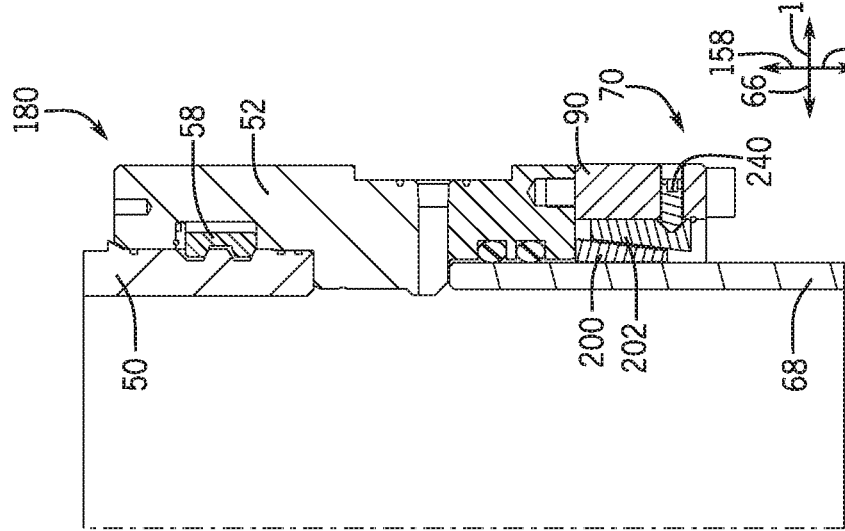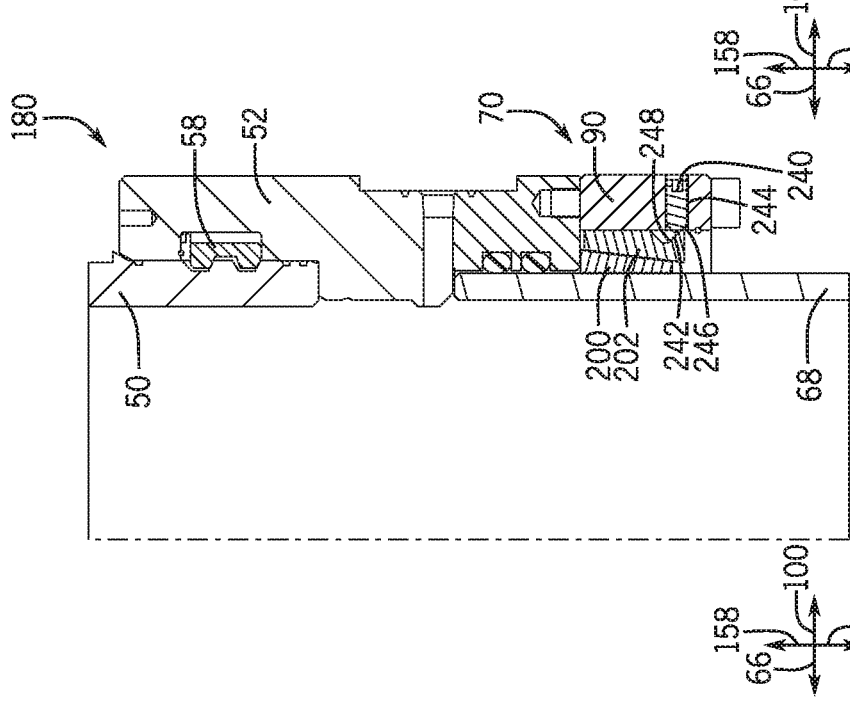

SLIP LOCK CONNECTOR SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, generate electricity, in addition to other uses. After discovery, drilling and production systems are used to access and extract the resource. These systems may be located onshore or offshore depending on the location of the resource. Such systems generally include a wide variety of components, such as various spools, housings, pipes, valves, fluid conduits, and the like, that facilitate drilling and/or extraction operations. Certain components of the mineral extraction system, such as conduits, pipes, or other tubulars, may be joined and sealed by locking mechanisms to provide a flow path for fluids during extraction.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 2 is a cross-sectional view of an embodiment of a first annular body with a slip lock connector system being lowered onto a second annular body;

FIG. 3 is a cross-sectional view of an embodiment of the first annular body with the slip lock connector system coupled to the second annular body of FIG. 2;

FIG. 4 is a cross-sectional view of an embodiment of the slip lock connector system of FIG. 3 in an energized state;

FIG. 5 is a cross-sectional view of an embodiment of the slip lock connector system of FIG. 4 in a deenergized state;

FIG. 6 is a cross-sectional view of an embodiment of the slip lock connector system and first annular body of FIG. 5 separating from the second annular body;

FIG. 7 is a cross-sectional view of an embodiment of a slip lock connector system coupling a first annular body to a second annular body;

FIG. 11 is a cross-sectional view of an embodiment of the slip lock connector system of FIG. 10 with a release fastener in a retracted position;

FIG. 12 is a cross-sectional view of an embodiment of the slip lock connector system of FIG. 11 with the release fastener in an energized position; and FIG. 13 is a cross-sectional view of an embodiment of the slip lock connector system and first annular body of FIG. 12 separating from the second annular body.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

The disclosed embodiments include a slip lock connector system capable of coupling annular bodies together. For example, the slip lock connector system may couple a diverter to a casing (e.g., tube, pipe) during drilling or production operations. The slip lock connector system may use one or more rings and/or segments (e.g., arcuate segments) to form a compression/friction connection with an annular body (e.g., tube, pipe). The rings and/or segments define respective tapered surfaces that enable the rings and/or segments to slide over each other to create radial movement that forms a compression/frictional engagement with an annular body. The rings and/or segments may be engaged/pressurized with an energizing fastener and/or with a load (e.g., weight) of an annular body. In other words, a fastener and/or a load of one of the annular bodies may drive a first tapered surface of a first ring or segments (e.g., segmented ring) over a second tapered surface of a second ring or segments (e.g., segmented ring) to couple a first annular body to a second annular body. To uncouple the first and second annular bodies, the slip lock connector system includes a release fastener (e.g., a threaded fastener that moves in a radial direction). In operation, the release fastener engages a ring and/or segment and drives the ring and/or segment in an axial direction that enables the slip lock connector system to radially contract and disengage from one of the annular bodies. The annular bodies may then be separated for future use.

Figure 1:
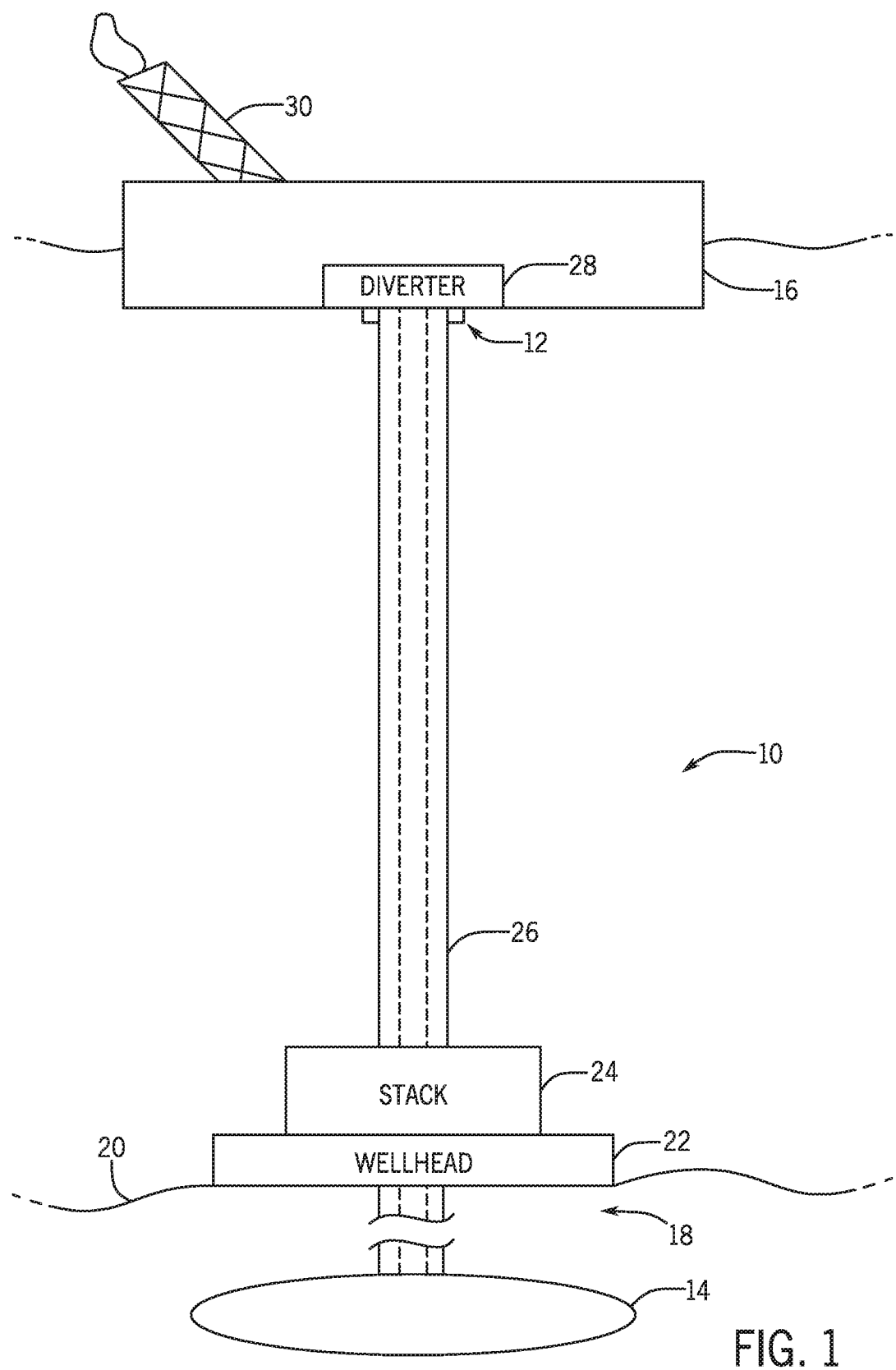
FIG. 1 is a schematic of a mineral extraction system with a diverter coupled to a conduit with a slip lock connector system.

FIG. 1 is a schematic of a mineral extraction system 10 (e.g., hydrocarbon extraction system) with a slip lock connector system 12 for connecting annular bodies of the mineral extraction system 10 (e.g., diverter, casing, tubes, pipes). The mineral extraction system 10 is used to extract oil, natural gas, and other natural resources from a subsea mineral reservoir 14. As illustrated, a ship or platform 16 positions and supports the mineral extraction system 10 over a mineral reservoir 14 enabling the mineral extraction system 10 to drill a well 18 through the sea floor 20. The mineral extraction system 10 includes a wellhead 22 to that forms a structural and pressure containing interface between the well 18 and the sea floor 20. Attached to the wellhead 22 is a stack 24. The stack 24 may include among other items blowout preventers (BOPs) that enable pressure control during drilling operations. In order to drill the well 18 to retrieve oil and/or gas from the mineral reservoir 14, the mineral extraction system 10 includes a riser 26 (e.g., tube, pipe) that couples the ship or platform 16 to the wellhead 22.

After drilling, natural resources (e.g., natural gas and oil) flow through the wellhead 22 and the riser 26 to the ship or platform 16. As natural gas reaches the ship 16, a diverter system 28 diverts mud, cuttings, and natural resources for separation. Once separated, natural gas may be sent to a flare 30 to be burned and/or stored for later consumption.

FIG. 2 is a cross-sectional view of an embodiment of a first annular body 50 (e.g., diverter) coupled to the slip lock connector system 12. As illustrated, the slip lock connector system 12 includes a housing 52. The housing 52 defines a ledge/counterbore 54 (e.g., annular ledge) that receives an end 56 of the first annular body 50. The housing 52 (e.g., annular housing) may couple to the first annular body 50 with a first connector 58 (e.g., a connector ring, split ring, C-ring, or segmented ring) that engages an exterior surface 60 of the first annular body 50. As illustrated, the exterior surface 60 may define one or more annular grooves 62 that receives the first connector 58. The first connector 58 rests within a groove 64 (e.g., annular groove) of the housing 52 enabling the housing 52 to slide over the exterior surface 60 of the first annular body 50. As the housing 52 slides over the first annular body 50, the end 56 of the first annular body 50 contacts the ledge/counterbore 54 of the housing 52. In this position, the first connector 58 is axially aligned with one or more grooves 62 in the exterior surface 60. The first connector 58 may then be energized to couple the first annular body 50 to the slip lock connector system 12. More specifically, the first connector 58 is driven radially inward in direction 66 into one or more grooves 62 in the exterior surface 60 of the first annular body 50. Once the first connector 58 enters the one or more grooves 62, the slip lock connector system 12 couples to the first annular body 50. The first connector 58 may be energized in any number of ways including hydraulic force, mechanical actuation, or a combination thereof.

After coupling to the first annular body 50, the slip lock connector system 12 is capable of coupling to a second annular body 68 with a slip lock connector 70 (e.g., second connector). For example, the slip lock connector system 12 may be lowered with the first annular body 50 in axial direction 72 until a ledge 74 (e.g., annular ledge) of the housing 52 contacts an end 76 of the second annular body 68.

FIG. 3 is a cross-sectional view of an embodiment of the first annular body 50 with the slip lock connector system 12 resting on the second annular body 68 of FIG. 2. As illustrated, the slip lock connector 70 includes a body connector 90 (e.g., annular connector) that couples to the housing 52 with a fastener 92. The body connector 90 defines a tapered interior surface 94 (e.g., conical or tapered annular surface) that engages a tapered surface 96 (e.g., conical or tapered annular surface) of a ring 98. It should be understood that in some embodiments the ring 98 may be substituted with a plurality of arcuate ring segments (e.g., 2, 3, 4, 5) that extend about the circumference of the second annular body 68, thereby defining a segmented ring.

In operation, the tapered surfaces 94 and 96 of the respective body connector 90 and ring 98 enable the slip lock connector 70 to couple the first annular body 50 to the second annular body 68 with a compression coupling. More specifically, as the tapered surfaces 94 and 96 slide past one another, the tapered surfaces 94, 96 drive the ring 98 radially inward in direction 66 and the body connector 90 radial direction 100. As the ring 98 is driven radially inward in direction 66, an interior annular surface 102 of the ring 98 contacts and grips an exterior surface 104 of the second annular body 68. In some embodiments, the interior surface 102 may include a plurality of protrusions and recesses that enable the ring 98 to "bite" or grip the exterior surface 104 of the second annular body 68.

FIG. 4 is a cross-sectional view of an embodiment of the slip lock connector system 12 of FIG. 3 in an energized state. In order to energize the slip lock connector 70, the slip lock connector system 12 includes an energizing fastener 120 (e.g., one or more threaded fasteners) that radially contacts a load ring 122 resting on a surface 124 of the ring 98. As the fastener 120 is threaded into an aperture 126 in the body connector 90, a tapered surface 128 (e.g., conical or tapered annular surface) on a tip or end 130 of the fastener 120 contacts a tapered surface 132 (e.g., conical or tapered annular surface) of the load ring 122. The force of the fastener 120 moving in radial direction 66 drives the load ring 122 in axial direction 72. As the load ring 122 moves in axial direction 72, the load ring 122 contacts the surface 124 of the ring 98, which drives the ring 98 in axial direction 72. As the ring 98 travels in axial direction 72, the tapered surface 96 of the ring 98 slides over the tapered surface 94 of the body connector 90. And as explained above, as the tapered surfaces 94 and 96 slide past one another, the body connector 90 is driven radially outward in direction 100 and the ring 98 is driven radially inward in direction 66. In this way, the ring 98 contacts and grips the second annular body 68 coupling the second annular body 68 to the first annular body 50. It should be understood that while a single energizing fastener 120 is illustrated, the slip lock connector system 12 may include multiple energizing fasteners 120 (e.g., 1, 2, 3, 4, 5) spaced evenly or unevenly about the circumference of the body connector 90.

As illustrated, the slip lock connector system 12 may include one or more gaskets 134 (e.g., 1, 2, 3, 4) placed within the one or more annular grooves 136 enabling the slip lock connector system 12 to form a fluid tight seal with the second annular body 68. The first annular body 50 may also form a fluid tight seal with the slip lock connector system 12. As illustrated, the first annular body 50 includes one or more annular grooves 138 (e.g., 1, 2, 3, 4, 5) that receive respective annular gaskets 140 that form a fluid tight seal with the housing 52. In some embodiments, the housing 52 may include annular grooves and gaskets for sealing with the first annular body 50.

FIG. 5 is a cross-sectional view of an embodiment of the slip lock connector system 12 of FIG. 4 in a deenergized state. In order to deenergize the slip lock connector 70, the slip lock connector system 12 includes a release fastener 150 that radially contacts and to drive the ring 98 in axial direction 158. The release fastener 150 (e.g., threaded fastener) rests in an aperture 152 in the body connector 90. In operation, the release fastener 150 radially threads into the body connector 90 until a tapered edge 154 (e.g., conical or tapered annular tip) on the release fastener 150 contacts a tapered surface 156 (e.g., conical or tapered annular surface) on the ring 98. The force of the tapered edge 154 contacting the ring 98 drives the ring 98 in axial direction 158. As the ring 98 moves in axial direction 158, the tapered surface 96 slides over the tapered surface 94 of the body connector 90. As the tapered surfaces slide past each other, the pressure/force of the slip lock connection 70 is released enabling the slip lock connector system 12 to separate from the second annular body 68. It should be understood that while a single release fastener 150 is illustrated, the slip lock connector system 12 may include multiple release fasteners 150 (e.g., 1, 2, 3, 4, 5) spaced evenly or unevenly about the circumference of the body connector 90.

FIG. 6 is a cross-sectional view of an embodiment of the slip lock connector system 12 and first annular body of FIG. 5 separating from the second annular body 68 after releasing the second annular body 68. As illustrated, as the first annular body 50 retracts an axial direction 158 the slip lock connector system 12 uncouples from the second annular body 68.

FIG. 7 is a cross-sectional view of an embodiment of a slip lock connector system 170 coupling a first annular body 50 to a second annular body 68. As illustrated, the slip lock connector system 170 is similar to the slip lock connector system 12 in FIGS. 2 through 6. However, the slip lock connector 170 is reversed. That is, the load ring 122 is below the ring 98 (e.g., split ring, C-ring, slip/ring segments) in axial direction 72. Accordingly, as the fastener 120 contacts the tapered surface 132 on the load ring 122, the load ring 122 moves in axial direction 158 driving the ring 98 likewise in axial direction 158. As the ring 98 moves in axial direction 158, the tapered surface 96 slides over the tapered surface 94 of the body connector 90. As the tapered surfaces 94, 96 slide over each other, the ring 98 moves radially inward in direction 66 and the body connector 90 moves radially outward in direction 100.

The slip lock connector system 170 likewise includes a release fastener 150. However, the release fastener 150 drives the ring 98 in axial direction 72 to deenergize the slip lock connector 70. As explained above, the release fastener 150 (e.g., threaded fastener) rests in a radial aperture 152 in the body connector 90. As the release fastener 150 threads radially into the body connector 90, a tapered edge 154 on the release fastener 150 contacts tapered surface 156 on the ring 98. The force from the release fastener 150 enables the tapered edge 154 to force the ring 98 in axial direction 72. As the ring 98 moves in axial direction 72, the tapered surface 96 on the ring 98 slides over the tapered surface 94 of the body connector 90. The body connector 90 is then able to move radially inward in direction 66 while the ring 98 moves radially outward in direction 100. With the pressure released the first annular body 50 and the slip lock connector system 170 may be withdrawn in axial direction 158 to couple the first annular body 50 from the second annular body 68.

Figure 8:
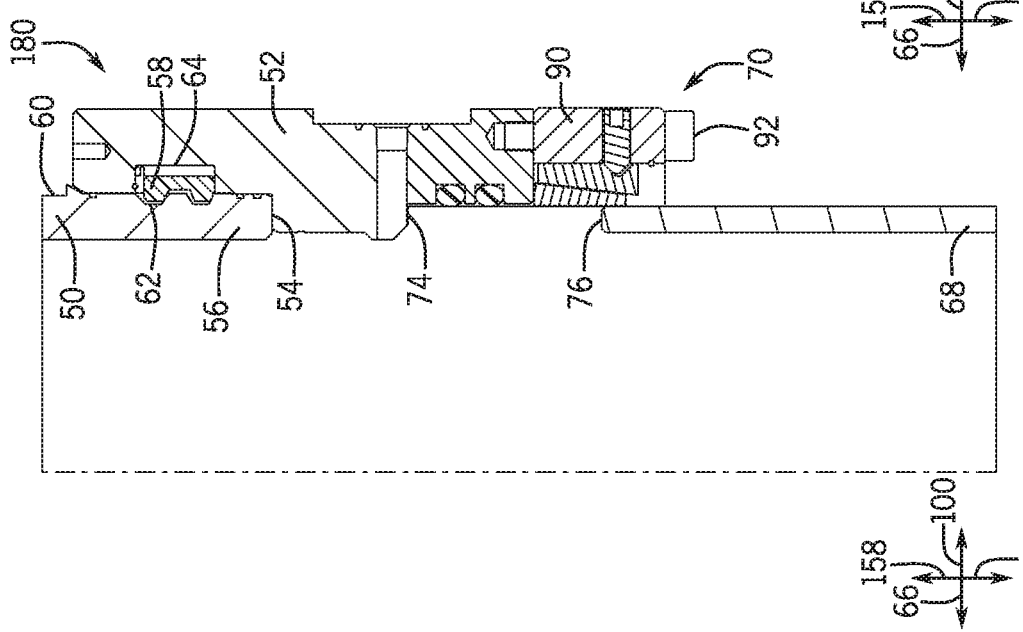
FIG. 8 is a cross-sectional view of an embodiment of a first annular body with a slip lock connector system being lowered onto a second annular body.

FIG. 8 is a cross-sectional view of an embodiment of a first annular body 50 with a slip lock connector system 180 being lowered onto a second annular body 68. The slip lock connector system 180 includes a housing 52 (e.g., annular). The housing 52 defines ledge/counterbore 54 (e.g., annular ledge) that receives an end 56 of the first annular body 50. The housing 52 may couple to the first annular body 50 with a first connector 58 that engages an exterior surface 60 of the first annular body 50. As illustrated, the exterior surface 60 may define one or more annular grooves 62 that receives the first connector 58. The first connector 58 rests within a groove 64 (e.g., annular groove) of the housing 52 enabling the housing 52 to slide over the exterior surface 60 of the first annular body 50. As the housing 52 slides over the first annular body 50, the end 56 of the first annular body 50 contacts the ledge/counterbore 54 of the housing 52. In this position, the first connector 58 is aligned with the one or more grooves 62 on the exterior surface 60 of the first annular body 50. The first connector 58 may then be energized to couple the first annular body 50 to the slip lock connector system 180. More specifically, the first connector 58 is driven radially inward in direction 66 into the one or more grooves 62 in the exterior surface 60 of the first annular body 50. Once the first connector 58 enters the one or more grooves 62, the slip lock connector system 180 is coupled to the first annular body 50. The first connector 58 may be energized in any number of ways including hydraulic force, mechanical actuation, or a combination thereof.

After coupling to the first annular body 50, slip lock connector system 180 is capable of coupling to a second annular body 68 with a slip lock connector 70 (e.g., second connector). The slip lock connector system 180 may then be lowered with the first annular body 50 in axial direction 72 until a ledge 74 (e.g., annular ledge) of the housing 52 contacts an end 76 (e.g., annular end) of the second annular body 68.

Figure 9:
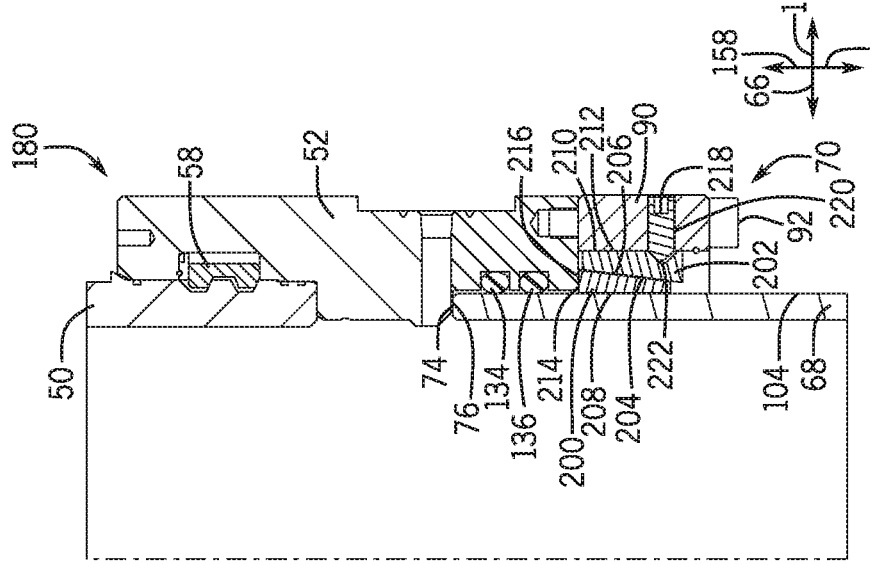
FIG. 9 is a cross-sectional view of an embodiment of the first annular body with the slip lock connector system of FIG. 8 coupled to the second annular body.

FIG. 9 is a cross-sectional view of an embodiment of the first annular body 50 with the slip lock connector system 180 coupled to the second annular body 68 of FIG. 8. As illustrated, the slip lock connector 70 includes a body connector 90 that couples to the housing 52 with a fastener 92. The body connector 90 supports first ring 200 (e.g., split ring, C-ring, slip/ring segments) and second ring 202. In some embodiments, the second ring 202 may be a solid ring that enables tighter tolerances and increased strength. However, in some embodiments, the second ring 202 may be a split ring, C-ring, or formed out slip/ring segments. When energized the first and second rings 200, 202 lock the slip lock connector system 180 to the second annular body 68.

The first and second rings 200, 202 define respective tapered surfaces 204, 206 (e.g., conical or annular tapered surfaces). In operation, the first and second tapered surfaces 204, 206 slide past one another to drive the first and second rings 200, 202 radially inward and radially outward. More specifically, the ring 200 is driven radially inward in direction 66 enabling an interior surface 208 of the ring 200 to contact an exterior surface 104 of the second annular body 68. In some embodiments, the interior surface 208 may include a plurality of protrusions and recesses (e.g., teeth) that enable the first ring 200 to "bite" or grip the exterior surface 104 of the second annular body 68. Similarly, the second ring 202 is driven radially outward in direction 100 enabling an exterior surface 210 of the second ring 202 to contact an interior surface 212 of the body connector 90. The exterior surface 210 of the second ring 202 may also include a plurality of protrusions and recesses (e.g., teeth) that enable the second ring 202 to "bite" or grip the interior surface 212 of the second annular body 68.

As illustrated, the first ring 200 is driven in axial direction 72 through contact between an axial abutment surface 214 of the first ring 200 and an axial abutment surface 216 of the housing 52. Accordingly, as the slip lock connector system 180 is lowered with the first annular body 50, the weight of the slip lock connector system 180 combined with the first annular body 50 drives the first ring 200 in axial direction 72. As the first ring 200 moves in axial direction 72, the tapered surface 204 of the first ring 200 slides over the tapered surface 206 of the second ring 202. In order to block the second ring 202 from moving in axial direction 72 with the first ring 200, slip lock connector 70 includes an energizing fastener 218 (e.g., threaded fastener). The energizing fastener 218 extends radially into an aperture 220 (e.g., threaded radial bore) of the body connector 90 and into a recess 222 of the second ring 202. Once inside the recess 222, the energizing fastener 218 blocks axial movement of the second ring 202 in direction 72, thereby enabling the slip lock connector system 180 to energize and lock with the second annular body 68. It should be understood that while a single energizing fastener 218 is illustrated, the slip lock connector system 180 may include multiple energizing fasteners 218 (e.g., 1, 2, 3, 4, 5) spaced evenly or unevenly about the circumference of the body connector 90.

Figure 10:
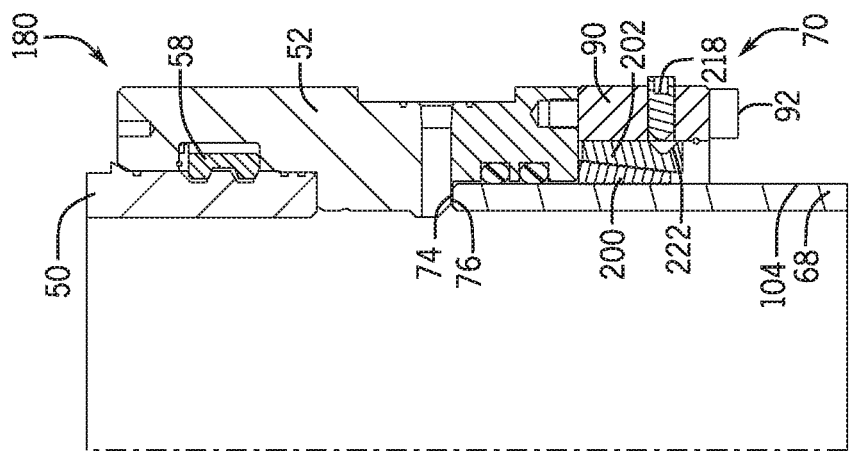
FIG. 10 is a cross-sectional view of an embodiment of the slip lock connector system of FIG. 9 with the energizing fastener in a retracted position.

FIG. 10 is a cross-sectional view of an embodiment of the slip lock connector system 180 of FIG. 9 being deenergized. In order to deenergize the slip lock connector 70, the energizing fastener 218 is radially withdrawn from the recess 222. As will be explained in detail below, after withdrawing the energizing fastener 218, the first and second rings 200, 202 are able to slide over one another to release the slip lock connection 70 with the second annular body 68.

FIG. 11 is a cross-sectional view of an embodiment of the slip lock connector system 180 of FIG. 10 with a release fastener 240 (e.g., threaded fastener). In order to release the slip lock connector 70, the slip lock connector system 180 includes the release fastener 240. The release fastener 240 is offset from the energizing fastener 218 about the circumference of the body connector 90. By offsetting the release fastener 240 from the energizing fastener 218, the release fastener 240 is able to radially engage the recess 242 in the second ring 202. More specifically, as the release fastener 240 passes through the aperture 244 (e.g., threaded radial bore), a tapered surface 246 of the release fastener 240 contacts the tapered surface 248 (e.g., conical or tapered annular surface) in the recess 242, which drives the second ring 202 in axial direction 72. As the second ring 202 moves in axial direction 72, the pressure of the slip lock connector 70 releases from the second annular body 68. It should be understood that while a single release fastener 240 is illustrated, the slip lock connector system 180 may include multiple release fasteners 240 (e.g., 1, 2, 3, 4, 5) spaced evenly or unevenly about the circumference of the body connector 90.

FIG. 12 is a cross-sectional view of an embodiment of the slip lock connector system 180 of FIG. 11 with the release fastener 240 radially engaging the second ring 202. As illustrated, once the release fastener 240 engages the second ring 202, the tapered surface 246 on the release fastener 240 slides over the tapered surface 248 of the second ring 202 driving the second ring 202 in axial direction 72. As the second ring 202 moves in axial direction 72, the slip lock connector 70 releases the second annular body 68 as the first ring 200 moves radially outward in direction 100 and the second ring 202 moves radially inward in direction 66. In other words, a slip lock connector 70 releases its pressurized grip on the second annular body 68.

FIG. 13 is a cross-sectional view of an embodiment of the slip lock connector system 180 and first annular body 50 of FIG. 180 separating from the second annular body 68. Once the slip lock connector 70 releases the second annular body 68, the slip lock connector system 180 and first annular body 50 may separate from the second annular body 68 by withdrawing in axial direction 158.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a slip lock connector system configured to couple a first annular body to a second annular body, wherein the slip lock connector system comprises:
a first structure comprising a first tapered surface;
a second structure comprising a second tapered surface; and
a threaded energizing fastener positioned within a radially-extending aperture of the slip lock connector system, wherein the threaded energizing fastener is configured to move radially through the radially-extending aperture and relative to the first structure and the second structure to cause the first tapered surface and the second tapered surface to slide over each other to drive the first structure and the second structure in radially opposite directions to couple the slip lock connector system to the second annular body, wherein the radially-extending aperture is formed in the second structure.

2. The system of claim 1, wherein the first structure comprises a C-ring.

3. The system of claim 2, wherein the slip lock connector system comprises a housing that is configured to circumferentially surround an end portion of the first annular body, and the second structure comprises an annular body connector that is coupled to the housing via a fastener.

4. The system of claim 1, wherein the slip lock connector system comprises a load ring positioned radially-inwardly of the threaded energizing fastener and axially stacked relative to the first structure, wherein the threaded energizing fastener is configured to move radially through the radially-extending aperture to contact the load ring to cause the first tapered surface and the second tapered surface to slide over each other.

5. The system of claim 4, wherein the threaded energizing fastener is configured to move radially through the radially-extending aperture to cause a third tapered surface of the threaded energizing fastener to contact a fourth tapered surface of the load ring.

6. The system of claim 5, wherein the slip lock connector system comprises a threaded release fastener positioned within an additional radially-extending aperture of the slip lock connector system, wherein the threaded release fastener is configured to move radially through the additional radially-extending aperture and relative to the first structure and the second structure to cause-release of the slip lock connector system from the second annular body.

7. The system of claim 6, wherein the radially-extending aperture and the additional radially-extending aperture are axially offset from one another along an axial axis of the slip lock connector system.

8. The system of claim 1, comprising the first annular body and the second annular body.

9. The system of claim 1, wherein the first structure comprises a plurality of arcuate segments that define the first tapered surface.

10. The system of claim 1, wherein the second structure circumferentially surrounds the first structure.

11. The system of claim 1, wherein the slip lock connector system comprises:

a housing configured to circumferentially surround an end portion of the first annular body; and a connector supported by the housing and configured to engage the first annular body to couple the slip lock connector system to the first annular body.

12. The system of claim 1, wherein the slip lock connector system comprises a plurality of additional threaded energizing fasteners, wherein each of the plurality of additional threaded energizing fasteners is positioned within a respective radially-extending aperture of the slip lock connector system.

13. A system, comprising:
a slip lock connector system configured to couple a first annular body to a second annular body, wherein the slip lock connector system comprises:
a first structure comprising a first tapered surface, wherein the first structure comprises a C-ring;
a second structure comprising a second tapered surface;
a load ring axially stacked relative to the first structure; and
an energizing fastener positioned within a radially-extending aperture of the slip lock connector system, wherein the energizing fastener is configured to move through the radially-extending aperture to contact the load ring to drive the load ring and the first structure axially a first direction to thereby slide the first tapered surface and the second tapered surface over each other to drive the first structure and the second structure in radially opposite directions to couple the slip lock connector system to the second annular body.

14. The system of claim 13, wherein the slip lock connector system comprises a housing that is configured to circumferentially surround an end portion of the first annular body, and the second structure is coupled to the housing via a fastener.

15. The system of claim 13, wherein the slip lock connector system comprises a release fastener positioned within an additional radially-extending aperture of the slip lock connector system, and the release fastener is configured move through the additional radially-extending aperture to drive the first structure axially in a second direction that is opposite the first direction to release the slip lock connector system from the second annular body.

16. A system, comprising:
a slip lock connector system configured to couple a first annular body to a second annular body, wherein the slip lock connector system comprises:
a first structure comprising a first tapered surface, wherein the first structure comprises a plurality of arcuate segments that define the first tapered surface;
a second structure comprising a second tapered surface;
a load ring axially stacked relative to the first structure; and
an energizing fastener positioned within a radially-extending aperture of the slip lock connector system, wherein the energizing fastener is configured to move through the radially-extending aperture to contact the load ring to drive the load ring and the first structure axially a first direction to thereby slide the first tapered surface and the second tapered surface over each other to drive the first structure and the second structure in radially opposite directions to couple the slip lock connector system to the second annular body.

\* \* \* \* \*